Dec. 31, 1963

F. HARPMAN 3,115,809

COLOR FILM PROCESS

Filed Feb. 12, 1962

FRED HARPMAN
INVENTOR.

BY [signature]

ATTORNEY

United States Patent Office 3,115,809
Patented Dec. 31, 1963

3,115,809
COLOR FILM PROCESS

Fred Harpman, 6917 Cahuenga Park Trail, Hollywood, Calif.

Filed Feb. 12, 1962, Ser. No. 172,549
4 Claims. (Cl. 88—24)

This invention relates to a process and technique in the field of colored motion pictures for achieving or producing "ghost" or transparent images on the screen in color.

An elucidation of the prior art in the field is necessary for a clear understanding and grasp of this invention.

Over the years, motion picture producers and technicians have used several methods to achieve "ghost" or transparent images on the screen. The most common is the traveling matt, or simply a double exposure or printing using two negatives. The dramatic content of scenes employing these techniques has always been limited due to the restrictions inherent in such methods. It is very significant that a moving "ghost" image has rarely, if ever been seen on the screen in color. The reason for this is that up to this time no one has devised a method by which such effects could be produced reasonably and with such quality as to be acceptable. Using prior known techniques the cost of producing these films in color is absolutely prohibitive. The technique of this invention, however, opens up a whole new field and dimension in this type of motion picture and the art of color film special effects offering virtually unlimited possibilities for creating special effects in color in a simplified, economically and easily practiced way.

Before proceeding with further exposition of the prior art background the nature of the herein invention will be enlarged upon somewhat at this point so that the significance of the prior art will be appreciated both from the standpoint of what it is able to accomplish and from the standpoint of what it is not able to accomplish at least in a practical, economical way.

The method of the herein invention is one which produces "ghost" or transparent images on the screen in the desired color over a normal or balanced background or set without the need of utilizing double printing or any other presently known method such as will be referred to hereinafter. The method hinges around a technique of printing color film negative, as will be explained more in detail hereinafter. The method is essentially a one-step process and is accordingly extremely simple. A few of the effects and/or variations which the herein invention makes it possible to produce for the first time on the screen, include the following:

A transparent color image which carries the dramatic action of a scene over a normal (solid) background in perfect color balance, that is, with a normally lit and appearing set.

A transparent figure in the desired color overlapping another solid figure in proper color balance.

More than one transparent image on the screen at a time, each a different color with the images either animate or inanimate.

A solid color balanced image suddenly separating into two or three different transparent images, each a different color over a normal background.

Colored transparent images combining to become whole or solid again.

Many other effects as will appear more in detail hereinafter. The foregoing examples utilizing the technique of this invention represents results obtainable from the original negative, i.e., from a single negative.

The herein invention utilizes certain techniques, processes and equipments known to the prior art; it combines them in a new way and adds new concepts and techniques thereto whereby its end results are accomplished. As pointed out in the foregoing therefore, it is desirable that certain techniques known to the prior art be described herein. For example, the Technicolor process is a three color process which is a basic method and procedure for producing motion pictures in color. It may be referred to as a dye transfer system. Such a system is a basic one. A dye transfer system is used in the lithographic and printing fields, these processes operating on similar principles. In such a system, ink is applied to plates representing the art, picture or material; the plate is part of a machine having means for passing paper through it to make contact with the plate or plates and receive an impression therefrom. There are, of course, many designs of such machines, but whether the plate is mounted on a rotating drum or is of the flat press variety, the plate picks up fresh ink from one source and transfers it or applies it to another element that is in most cases paper. One color pigment is applied at a time. The paper receives the desired number of colors necessary to produce the desired result or to satisfy the job requirements. It is the overlap of the various colors in their respective densities that combine to create and determine a full palette.

The fewer colors that a system requires to achieve a full palette of quality, the more desirable is the system. Technicolor is a desirable system in this respect. It is a three color process using colors which by name are yellow, cyan (blue) and magenta.

In the said Technicolor process, after the original negative (usually Eastman color film stock) is developed, it is separated by color filters into three negatives. One of these negatives represents the yellow plate, one the cyan plate, and one the magenta (red) plate. The word "plate" is used here more or less figuratively to illustrate the analogy to the lithographic and printing processes referred to above. In the motion picture field, however, these negatives are not ordinarily referred to as plates, but rather the negatives are referred to as the "yellow record," the "cyan record," and the "magenta record" and are also known as "color separation negatives." In printing the raw film stock the three records act in the manner of printing plates referred to above since they receive a cetrain formula of dye (ink) and transfer (print) it on the raw film stock. The raw film stock is analogous to the paper in the lithographic process referred to above. Each record contributes its portion of color to the total picture.

Throughout this application reference has been and will be made to synchronization of the color separation negatives and/or to printing them out of "sync." Such reference is intended to indicate that the record or separation negative that is printed "out of sync" is actually merely linear displaced along the length of the film so that the frames thereon represent images exposed at a different time from the frames on the other records.

The film craftsman synchronizes film footages by an edge numbering system which exists at one foot intervals on the film edge. Each of the three records has the identical edge numbers as exists on the master negative from which they were made. Instructions as to developing, printing, synchronization, editing, sound dubbing, etc., all are dependent on the edge number reference. There are sixteen (16) frames between numbers. Film is projected at a normal rate of a foot-and-a-half per second, or twenty-four (24) frames. It is a simple matter to synchronize to an exact frame by referring to the nearest edge number (going in the direction of the film) plus the number of frames. For example, a typical edge number might be C7X20530. If the instructions were to end the scene four frames past that number, it would read C7X20530+4. The "out of sync" tolerance in film printing can be as much as three frames without noticeable "register" and be acceptable. Four frames off can be detected by the trained eye and is "NG"—no good.

It should be pointed out, that in all printed media, the objective has always been to achieve perfect register or overlap of the various colors to produce clarity of color and picture reproduction. The herein invention respects this objective, but makes it possible to create an unlimited variety of visual effects, including some that are entirely novel in a new simplified and economic way.

Before proceeding with a detailed description of the technique of this invention, it may be stated that its basic object is that delineated at the opening of the foregoing discussion. Other more specific objects include the creation of the effects referred to in the foregoing in a simplified and economical way, as well as other effects. Additional more specific objects will become more clear from the ensuing detailed description. An understanding of the description of the invention will be facilitated by reference to the figures of the drawings wherein.

DESCRIPTION OF THE TECHNIQUE

To facilitate an understanding of the invention, each record as referred to in the foregoing may be considered a separate picture to be printed in manners described hereinafter and in such a way as to not shown any "out of sync" register in the scene. In filming, to produce the original negative, the camera is tied down to minimize movement. The action to be filmed is controlled to meet specifications and excess footage is exposed to match the time of the action. The technique may be best illustrated by way of examples. For instance, if the desired effect for a scene is for a transparent red image of a man to enter a room, cross, and exit, the first step is to determine how long the action takes. If it is twenty seconds, then in order to advance the magenta (red) record ahead twenty seconds over a normal solid background, twenty seconds of film must be shot of the set before starting the action. This allows the printer to print the magenta record "out of sync" thirty feet and still have it properly overlap the other two records for a balanced background. This is possible because nothing in the scene moves except the actor. Everything else automatically overlaps. The printing of one or more of the records "out of sync" (or displaced with respect to the time of the action) with others of the records is of primary significance in the invention, as will become apparent.

The printing of the records "out of sync" requires abnormal or more appropriately, special printing instructions to the film craftsman in accordance with the herein invention. In the foregoing example it may be supposed that the scene started at C7X30336 and ended at C7X30396, that is, sixty feet of film. The actor in this example does not enter the scene until after the first thirty feet of film have been exposed or at C7X30366. In order to get the effect on the screen of the same actor in a transparent red image, the magenta record must be printed ahead or "out of sync" for the full length of the action, as will be illustrated hereinafter. In this example, the action takes twenty seconds or thirty feet of film. So, the chart from which the printing instructions are taken by the craftsman would indicate to print the three records together as usual, but to start and end them on the following edge numbers:

Magenta—record from C7X30366 to 396
Yellow—record from C7X30336 to 366
Cyan—record from C7X0336 to 366

Figure 1:
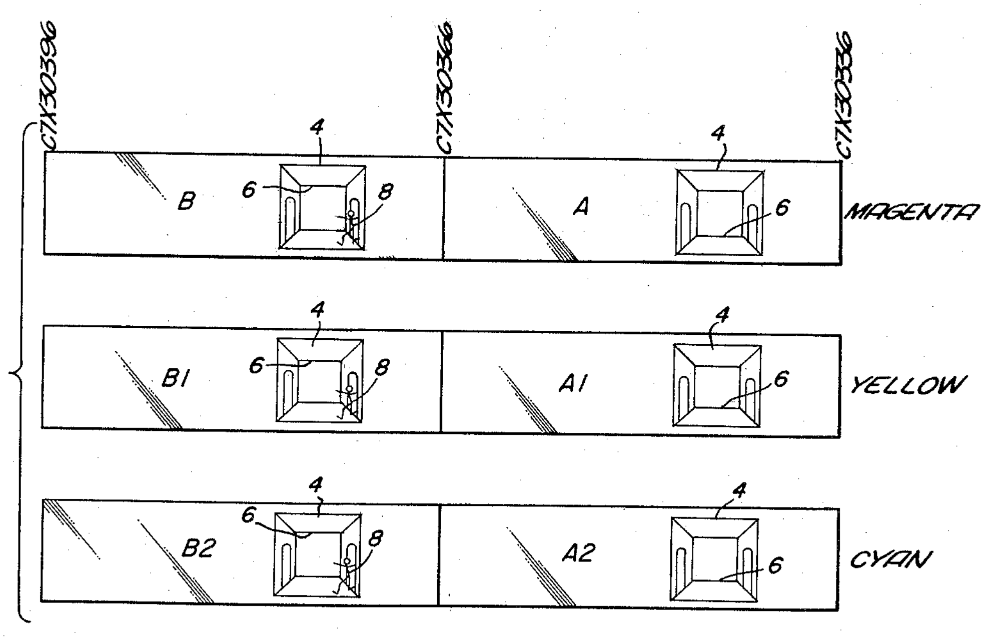
FIGURE 1 is a diagrammatic illustration of an example of an adaptation of the invention.

The foregoing tabulation is graphically illustrated in FIGURE 1. This figure illustrates the three records, i.e., magenta, yellow and cyan. The tabulated edge numbers are shown in the figure. Each of the records represents sixty feet of film, the mid-point or thirty foot point of which, at which the action started is indicated by the edge number C7X30366. It will be remembered from the previous explanation that the three records together are used to print the raw film stock. The first and second thirty foot portions of the records are designated on FIGURE 1 by the letters "A" and "B." Now it will be observed that the meaning of the foregoing table or chart of printing instructions is that the negative will be printed from the sections of the records in FIGURE 1 designated "B," "A–1" and "A–2." In other words, "A–1" and "A–2" are printed "in sync" and "B" is printed advanced thirty feet "out of sync." Or figuratively one might say that the sections "A–1," "A–2" and "B" are superimposed on each other or rather their images are superimposed on each other and printed onto the raw film stock. It will be observed that in the printing step everything is "in sync" for the reason that there was no action in the first thirty feet of exposure, i.e., nothing moved and so there are no images of the man on sections "A–1" and "A–2" for the images of the man in section "B" to be synchronized with. When the film so produced or prepared is projected onto a screen, the image of the man will appear as a transparent red image in a solid or balanced or normally lit background. This results from the combining of the three colors, magenta, yellow and cyan of the sections "A–1," "A–2" and "B" with respect to everything except the images of the man, which were only on record section "B" and therefore now appear when projected as only transparent red images.

To more fully explain the invention as illustrated in FIG. 1, the figure shows a representative picture frame 4 in each of the sections A and B. In the first set of records A, the picture frame 4 consists of an exposure of only a background, for example, the room 6 depicted thereon and the set A consists of the number of frames exposed during the first thirty feet of film, each of which frames shows only the background room 6. After the first thirty feet of film was exposed, an actor, for example, the figure 8, performs an action such as entering the room 6 and ultimately leaving the same. When the color records are made, they will consist of a first set A, A–1, and A–2, having only the background appearing thereon and a second set B, B–1 and B–2 having thereon identically the same background plus the figure 8 performing an action therein. To print the ultimate or final film the processor may select, for example, the section B in the magenta color and with that, use the sections A–1 and A–2 in yellow and cyan. By thus combining these three records, selected from the two different sets, and printing a film therefrom, the entire background will be printed in full natural color since all color components thereof are present. However, since the figure 8 appears only in the magenta section B, the final film will have only a magenta image of that figure superimposed over a full color background and it will appear thereon as a transparent ghost image. It can thus be seen that the section B of the second set of records has been printed "out of sync" with the sections A–1 and A–2 of the first set, in the sense that the final film contains material from section B that was actually filmed at a different time from the material appearing on sections A–1 and A–2 of the first set.

The foregoing example is illustrative of virtually unlimited other effects that can be created and achieved by the herein invention.

The following is another specific example of an adaptation of the technique of the invention. This is a simple scene in which a cigarette burns away on the edge of an ashtray. Everything appears normal except that the smoke rises in three colors. This is accomplished by having the three records printed, eight frames "out of sync," that is, each frame of each record is displaced eight frames from the corresponding frame of the next record.

To achieve this effect the printing instructions would be in accordance with the following chart or table:

Yellow—record from C7X20325+10 to 339
Cyan—record from C7X20325+2 to 338+8
Magenta—record from C7X20324+10 to 338

In this scene nothing is moving except the smoke. The only difference between adjacent frames therefore, is in the smoke. Accordingly, the raw film stock when thus printed and projected produces a picture having a normal or balanced background. Only the smoke is "out of sync," the configuration of the smoke varies over eight frames. As a result, there will appear in each frame, three transparent images of the smoke in the three different colors each color depicting the position and configuration of the smoke as it actually existed at different times.

Figure 2:
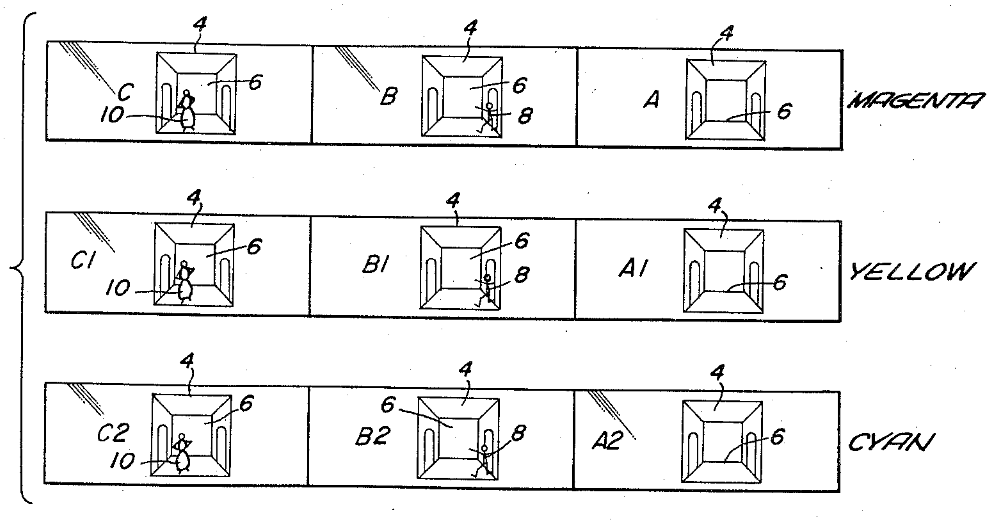
FIGURE 2 is a diagrammatic illustration of another adaptation of the invention.

FIG. 2 shows a further possibility according to applicant's method and wherein sections A and B, consisting of a first and second set of color separation negatives or records may be identical to the first and second sets described with reference to FIG. 1 and contain exactly the same image thereon. However, a further set, C, C–1 and C–2 may be provided containing a different and additional action from the figure 8 already described. For example, after filming the two sets described with reference to FIG. 1, the third set may be filmed in which a further figure 10 performs some action in the room 6. In printing the final color film, one would then select, for example, section C–1 of the third set, section B of the second set, and section A–2 of the first set. Thus, all of the background would be printed in full natural color since all of the color components thereof appear in the three sections or records selected. The figure 8, however, would appear only in magenta and the figure 10 would appear in the same scene but only in yellow and thus two ghost figures would be present in a full color background printed from sections C–1, B and A–2.

The foregoing examples are merely illustrative of the virtually limitless effects that can be created using the technique of the invention. These possibilities spring from the technique of printing the records "out of sync" or in other than conventional orders, arrangements or ways. The three records are available, as explained, to print "out of sync," to shuffle, separate, combine, flop, dissolve, fade, etc. Infinite numbers of possibilities suggest themselves without the need of a specific example of each, both within and without the variations enumerated at the outset hereof. For example, in the illustration of FIGURE 2, the action might be that of a man mounting a stairway with one-third of it traversed in each of the sections "A," "B" and "C." The action would then be manifested by way of three different colored transparent images of the man in the projected picture. These images would be identical, similar or wholly unlike, depending on the directed action. For instance, the action might be such that the images are alike except that the middle one, say, is looking back watching the third one; innumerable such creations are possible opening up new dimensions in the field of special effects.

From the foregoing, those skilled in the art will observe that the invention as described herein achieves the objects outlined and realizes the advantages dealt with in the foregoing, as well as having many additional advantages and possibilities which are apparent from the detailed description. The technique is extremely simple, constituting essentially a single step. It is simple, dependable and strikingly economical and thereby possesses unusual merit in these areas.

The foregoing disclosure is representative of preferred forms of the invention and is to be interpreted in an illustrative rather than a limiting sense, the invention to be accorded the full scope of the claims appended hereto.

What is claimed is:

1. A method of creating motion picture effects in color comprising the steps of: preparing a first set of a plurality of film records, each showing only a predetermined color content of the same background, each record being of a different color; preparing a second set of a plurality of color film records, each depicting a predetermined action separate from said background and showing the different color content of said predetermined action corresponding to the color content of the records of said first set; selecting one of said records from said second set and using the same along with records from said first set to print color film wherein said background appears in full color and said predetermined action appears in only one color, as a transparent ghost image.

2. The method defined in claim 1 wherein all the color records of both said sets contain the same background and wherein that record of said first set, corresponding in color to said one selected record from said second set, is discarded and replaced by said one selected to thereby produce a color film with the background in full color and said predetermined action in only the color of said one selected record.

3. The method of claim 1 including the steps of preparing a third set of color film records, corresponding to the colors of the records of said first and second sets, and depicting a further action thereon; selecting one of said records from said third set, of a color different from the record selected from said second set, and using both said selected records with said records from said first set to print color film wherein said background appears in full color while said predetermined action and said further action appear in separate single colors as transparent ghost images.

4. The method of claim 3 wherein each of said sets of records comprises three differently colored records, each containing the same background and wherein those records of said first set, corresponding in color to the selected records of said second and third sets, are discarded.

References Cited in the file of this patent

UNITED STATES PATENTS 2,586,378 Pohl ------------------ Feb. 19, 1952